United States Patent [19]

Farney et al.

[11] Patent Number: 4,706,834
[45] Date of Patent: Nov. 17, 1987

[54] COUPLER COVER APPARATUS

[76] Inventors: Michael K. Farney, 1613 Grinnell; Jackson Kile, 2305 S.W. Loop Rd., both of Perryton, Tex. 79070

[21] Appl. No.: 12,138

[22] Filed: Feb. 6, 1987

[51] Int. Cl.⁴ ............................................. B65D 51/00
[52] U.S. Cl. .................................... 220/230; 206/818
[58] Field of Search ................. 220/230, 315; 138/89; 206/818

[56] References Cited

U.S. PATENT DOCUMENTS

| | | | |
|---|---|---|---|
| 2,672,257 | 3/1954 | Simmonds | 220/230 |
| 2,717,096 | 9/1955 | Henderson. | |
| 2,758,743 | 8/1956 | Smith. | |
| 2,761,717 | 9/1956 | Mahlke | 292/251.5 |
| 2,802,592 | 8/1957 | Clifton. | |
| 3,365,684 | 1/1968 | Stemke et al. | 335/302 |
| 3,961,721 | 6/1976 | Gordon et al. | 220/230 |
| 4,045,291 | 9/1977 | Berger | 195/127 |
| 4,060,100 | 11/1977 | Miller et al. | 138/89 |
| 4,168,129 | 9/1979 | Herrnring | 220/230 |
| 4,300,597 | 11/1981 | Delay, Sr. | 128/89 |
| 4,329,857 | 5/1982 | Kittle | 220/229 |

Primary Examiner—George T. Hall
Attorney, Agent, or Firm—Clifford C. Dougherty, III

[57] ABSTRACT

An apparatus for protecting the open end of the female half of a metallic hydraulic line coupler when the female half is not coupled to the male half of the coupler is provided. The apparatus includes a magnetic cover member releasably attachable to the female half of the coupler by the exertion of magnetic force thereon. The cover member has a first surface which completely covers the open end of the female half of the coupler when the cover member is magnetically attached thereto. Magnetic force deflecting means are attached to the magnetic cover member for redirecting at least a substantial portion of any of the magnetic force directed away from the female half of the coupler toward the female half of the coupler.

27 Claims, 10 Drawing Figures

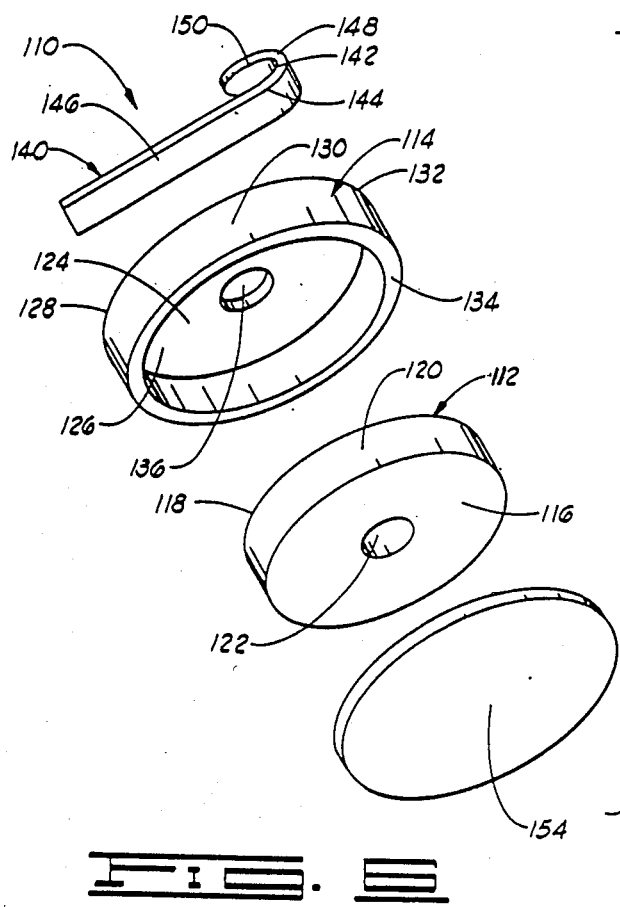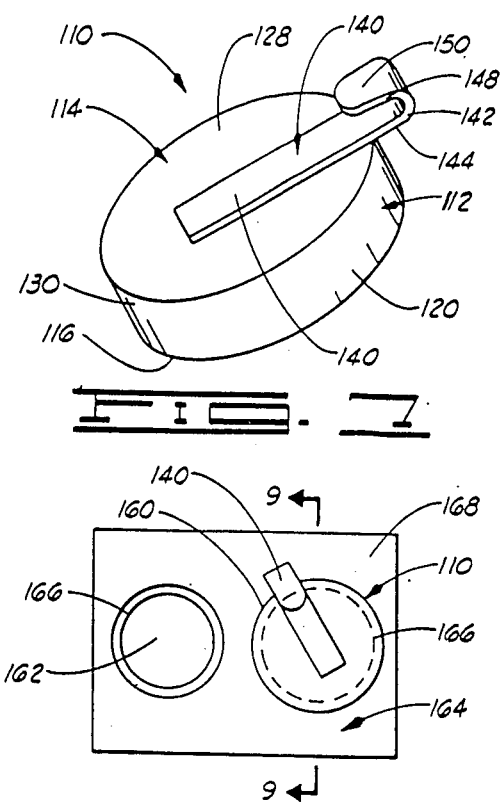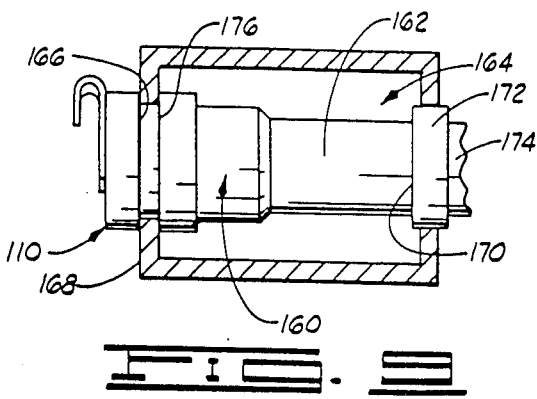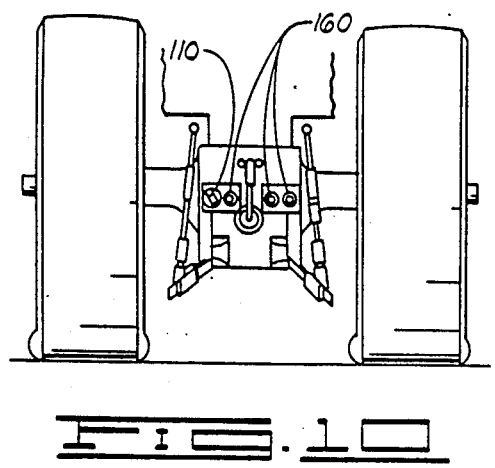

1

COUPLER COVER APPARATUS

BACKGROUND OF THE INVENTION

1. Field of the Invention

This invention relates in general to apparatus for protecting hydraulic line couplers, and more particularly, but not by way of limitation, to an apparatus for covering the open end of the female half of a hydraulic line coupler when the male half of the coupler is not coupled thereto.

2. Description of the Prior Art

Hydraulic line hookups or couplers are devices connected to hydraulic fluid conducting lines which allow the lines to be separated and coupled back together. One type of coupler device is referred to as a "quick" or "quick-connect" coupler. Many agricultural, commercial and industrial tractors and trucks utilize hydraulic systems equipped with one or more quick-connect couplers. The quick-connect couplers allow the hydraulic systems of various trailers, implements and/or equipment to communicate with the main hydraulic systems of the tractors and trucks. Hydraulic lines conducting fluid to and/or from the hydraulic systems can be rapidly coupled together and separated. The couplers seal the hydraulic lines when they are separated to prevent the loss of hydraulic fluid therefrom.

Quick-connect couplers are divided into two halves, a male half and a female half. Typically, the female half of the coupler is attached to one of the hydraulic fluid lines conducting fluid to and/or from the hydraulic system of the tractor or truck while the male half of the coupler is attached to one of the hydraulic fluid lines conducting fluid to and/or from the hydraulic system of the trailer, implement or equipment. The femal half of the coupler includes a fluid passage cavity having two ends, a first end connected to the hydraulic fluid line and a second end that mates with the male half of the coupler. The male half fits within the female half to connect the hydraulic lines together. Some type of locking device maintains the halves in place. The entire coupler or at least a substantial portion thereof is formed of metal.

When the male half of the coupler is not connected to the female half, the second end of the fluid passage cavity of the female half of the coupler is open to the atmosphere. As a result, dust, dirt and other contaminants are allowed to accumulate thereon. Although the flow of hydraulic fluid is shut off, a few drops of hydraulic fluid often remain on the open end of the cavity which causes the contaminants to stick together and build up. When the male half of the coupler is inserted into the female half thereof, the contaminants are often forced into the hydraulic systems of the tractors, trucks and/or equipment. In many instances, the contaminants prevent the male half of the coupler from being inserted into the female half thereof at all. In order to prevent contaminants from entering and interfering with the operation of the hydraulic systems of the tractors, trucks and/or equipment, the second end of the fluid passage cavity, hereinafter referred to as the open end of the female half of the coupler, must be protected when the male half of the coupler is not coupled thereto.

A variety of covers and plugs have been developed to cover the open end of the female half of a hydraulic line coupler. Many of such devices consist of a rubber or plastic male half counterpart which is inserted into the female half when the male half of the coupler is disconnected therefrom. Other devices that have been developed consist of rubber or plastic covers or boots which fit over the female half of the coupler. Some of the boots include a slit in the end thereof adjacent the open end of the fluid passage cavity which allows them to be permanently attached to the female half of the coupler. The slit remains closed and covers the opening when the male half of the coupler is not connected. Many other types of covers have been devised for permanent attachment to the female half of the coupler. Some types of covers automatically pivot to cover the opening when the male half is removed from the female half of the coupler.

The prior art devices are insufficient for many reasons. Covers, plugs and boots made of plastic or rubber often become hard and brittle which decreases their sealing ability and makes them hard to use. Such devices often tear or deteriorate after short periods of use and usually fit only specific sizes and types of couplers. Pieces of plastic or rubber from the deteriorating plugs or covers often end up in the hydraulic systems they protect. Furthermore, the covers or boots often fall off the female half during use and are often lost or destroyed when they are not in use. The devices that are permanently mounted to the female half of the coupler are expensive to manufacture and generally fit only certain types of couplers.

There is a need, therefore, for an apparatus for protecting the open end of the female half of all types and sizes of hydraulic line couplers. There is a need for such an apparatus that is durable, easy to manufacture, easy to use and easy to store.

SUMMARY OF THE INVENTION

The present invention provides an apparatus for protecting the open end of the female half of a metallic hydraulic line coupler. The apparatus includes a magnetic cover member releasably attachable to the female half of the coupler by the exertion of magnetic force thereon. The cover member has a first surface which completely covers the open end of the female half of the coupler when the cover member is magnetically attached thereto. The magnetic force exerted on the female half of the coupler is of a strength great enough to maintain the cover member in place, but not so great as to prevent the cover member from being removed by hand.

The magnetic cover member is preferably shaped in the form of a disk having a second surface axially spaced from the first surface and a circular peripheral side wall interconnecting the second surface and the first surface.

Magnetic force deflecting means are attached to the magnetic cover member for redirecting at least a substantial portion of any of the magnetic force directed away from the female half of the coupler toward the female half of the coupler. In a first preferred embodiment of the invention, the deflecting means are comprised of a plate member covering the second surface of the magnetic cover member. In a second preferred embodiment of the invention, the deflecting means are comprised of a cup member covering the second surface and the side wall of the cover member.

The magnetic cover member of the first embodiment is polarized such that both the north and south poles thereof are located on the first surface.

It is therefore an object of the present invention to provide an apparatus for protecting the open end of the female half of a hydraulic line coupler when the male half is not coupled thereto.

It is also an object of the present invention to provide such an apparatus that is easy to use, store and maintain.

A further object of the present invention is to provide such an apparatus that may be used in connection with all types of hydraulic line couplers, regardless of their size.

Another object of the present invention is to provide an apparatus of the type described above that will not become hard and brittle or deteriorate, and that will not otherwise lose its sealing ability after extended use.

Numerous other objects, features and advantages of the present invention will be readily apparent to those skilled in the art upon a reading of the following disclosure when taken in conjunction with the accompanying drawings.

BRIEF DESCRIPTION OF THE DRAWINGS

FIG. 6 is an enlarged perspective view of a second preferred embodiment of the apparatus of the present invention before assembly thereof.

FIG. 7 is an enlarged perspective view of the apparatus shown in FIG. 6 after final assembly thereof.

FIG. 8 is a front view of the apparatus shown in FIGS. 6 and 7 as used to protect the open end of the female half of a modified type of hydraulic line coupler.

FIG. 9 is a cross-sectional view of the apparatus and coupler taken along line 9—9 of FIG. 8.

FIG. 10 is a front view of the apparatus shown in FIGS. 6-9 as used to protect the open end of the female half of the type of hydraulic line coupler shown in FIGS. 8 and 9 attached to a tractor.

DETAILED DESCRIPTION OF THE PREFERRED EMBODIMENTS

Figure 1:
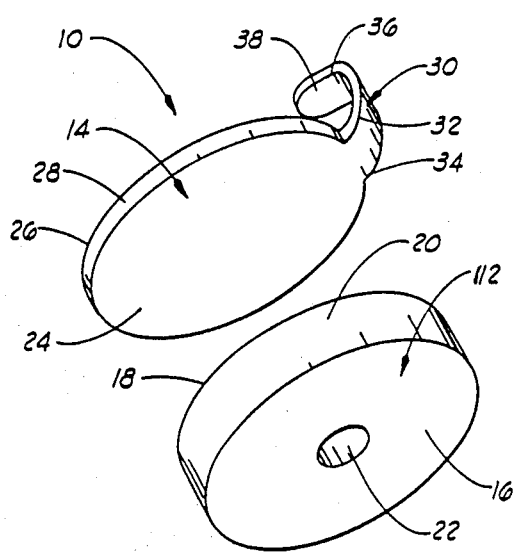
FIG. 1 is an enlarged perspective view of a first preferred embodiment of the apparatus of the present invention before assembly thereof.
Figure 2:
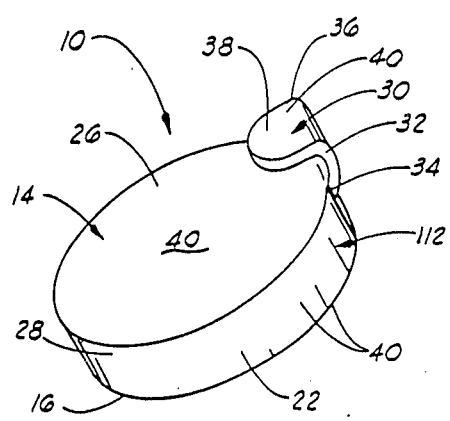
FIG. 2 is an enlarged perspective view of the apparatus shown in FIG. 1 after final assembly thereof.

Referring now to the drawings and particularly to FIGS. 1 and 2, a first preferred embodiment of the present invention is illustrated and generally designated by the numeral 10. The apparatus includes a magnetic cover member 12 and magnetic force deflecting means in the form of a plate member 14. The apparatus is used to protect the open end of the female half a metallic hydraulic line coupler when the male half is not coupled thereto.

The magnetic cover member 12 has a first surface 16 and an opposite second surface 18 axially spaced from the first surface. It is shaped in the form of a disk and has a circular peripheral side wall 20 inteconnecting the second surface 18 and the first surface 16. The magnetic cover member 12 is preferably formed of ceramic material. Ceramic disk-shaped magnets are commercially available. As shown in FIG. 1 such magnets often have a hole 22 disposed through the center thereof. The hole 22 is not important to the operation of the apparatus 10.

The plate member 14 is attached to the magnetic cover member 12 and covers the second surface 18 thereof. It is also shaped in the form of a disk and includes a circular first surface 24, an opposite circular second surface 26 axially spaced from the first surface and a circular peripheral side wall 28 interconnecting the first surface and the second surface. As shown in FIG. 2, the first surface 24 of the plate member 14 is attached to the second surface 18 of the magnetic cover member 12. As long as it is rigidly attached, the means by which the plate member 14 is attached to the second surface 18 of the cover member 12 is not important. It can be adhesively bonded to the second surface 18 if desired.

The first surface 24 of the plate member 14 preferably has a diameter at least as large as the diameter of the first surface 16 of the magnetic cover member 12. The diameter of the first surface 24 of the plate member 14 and the diameter of the first surface 16 of the magnetic cover member 12 are preferably the same. The diameters of both are most preferably approximately two inches. The thickness of the plate member 14 is less than the thickness of the magnetic cover member 12. Preferably, the plate member 14 is less than half as thick as the magnetic cover member 12. The plate member 14 is preferably formed of steel.

Pry means are attached to the apparatus 10 to facilitate removal of the apparatus from the female half 50 of the coupler. Any form of pry means can be used. As shown in the drawings, the pry means are in the form of a finger tab 30. The finger tab 30 includes a curvilinear portion 32 having a first end 34 attached to the side wall 28 of the plate member 14 and a second end 36 attached to a tab portion 38. The tab portion 38 is positioned above the second surface 26 of the plate member 14. The pry means can also be in the form of a knob attached to the second surface 26 of the plate member 14. Such a knob is preferably molded out of plastic. It can be integrally molded with the plate member if desired.

A thin layer of rubber 40 is attached to at least the first surface 16 and side wall 20 of the magnetic cover member 12 to protect the cover member and to prevent chips thereof, if any, from remaining in or around the female half of the coupler and entering the hydraulic system of the tractor or truck. The layer of rubber 40 also acts as a seal between the magnetic cover member 12 and the female half of the coupler. As shown in FIG. 2, the thin layer of rubber 40 preferably surrounds the entire assembly including the magnetic cover member 12, plate member 14 and finger tab 30.

Figure 4:
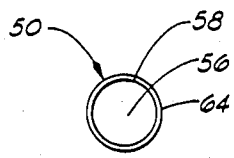
FIG. 4 is a cross-sectional view of the female half of the coupler taken along line 4—4 of FIG. 3.
Figure 3:
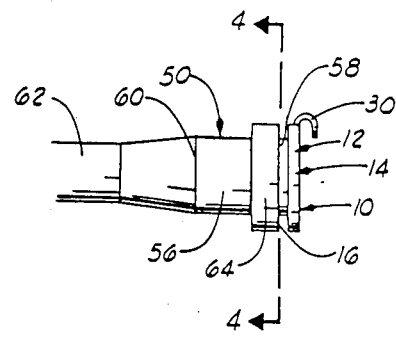
FIG. 3 is a side, schematic view of the female half of a hydraulic line coupler having the apparatus of the present invention attached thereto.
Figure 5:
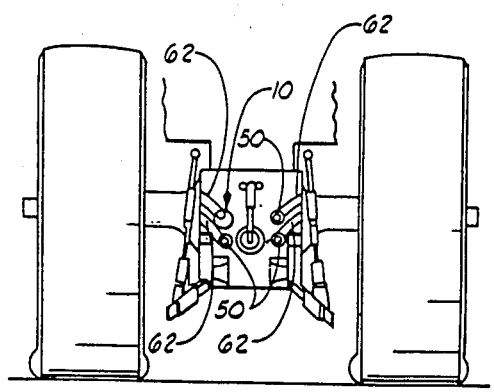
FIG. 5 is a front view of the apparatus as used to protect the open end of the female half of a hydraulic line coupler attached to a tractor.

Referring now to FIGS. 3-5, the operation of the apparatus 10 will be described. The apparatus 10 may be used in association with any type of hydraulic line coupler. It is particularly suitable for use in association with quick-connect type couplers of the type wherein the female half is attached directly to the end of a hydraulic fluid conducting line or hose. A female half 50 of this type of coupler is schematically illustrated in FIGS. 3 and 4. The male half of the coupler is not shown in the drawings. The female half 50 of the coupler includes an elongated, cylindrical fluid passage cavity 56 having an annular first end 58 and a second end 60. The second end 60 is connected to a hydraulic line 62 which carries hydraulic fluid to and/or from the hydraulic system of the tractor, truck, implement or the like. The male half of the coupler is inserted into the cavity 56 through the first end 58 to couple the halves and corresponding hydraulic lines together. An annular locking mechanism 64 is used to maintain the male half and female half 50 of the coupler in place.

When the male half of the coupler is not coupled to the female half 50 thereof, the first end 58 is open to the atmosphere. The apparatus 10 of the present invention is used to cover and protect this open end.

The magnetic cover member 12 is releasably attachable to the female half 50 of the coupler by the exertion of magnetic force thereon. The first surface 16 of the magnetic cover member 12 completely covers the open end 58 of the female half 50 of the coupler when the magnetic cover member 12 is attached thereto.

The first surface 16 of the magnetic cover member 12 is sufficiently flat and smooth to create a dust-tight seal between the open end 58 and the atmosphere when the magnetic cover member is attached to the female half 50 of the coupler. The diameter of the annular, open end 58 of the female half 50 of the coupler is less than the diameter of the first surface 16 of the magnetic cover member 12. The diameter of the first surface 16 of the magnetic cover member 12 is sufficiently large for the surface to cover the open end of the female half of almost all types and sizes of couplers.

An ordinary disk-shaped magnet is polarized with one pole on each surface of the disk. Such a magnet tends to move toward the edge of an annular striking surface such as the open end 58 of the female half 50 when attached thereto. The magnetic cover member 12 of the present invention, however, is polarized such that both the north and south poles thereof are located on the first surface 16. As a result, the first surface 16 is magnetically stronger than the second surface 18 and the magnetic cover member tends to center on the annular, open end 58 of the female half 50 of the coupler when attached thereto.

The magnetic cover member 12 remains attached to the female half 50 of the coupler 52 by exerting magnetic force thereon. Although the bulk of the magnetic force exerted by the magnetic cover member 12 is exerted toward the female half 50 of the coupler, some force is exerted in other directions. In order to increase the amount of magnetic force exerted on the female half 50 without increasing the mass of the magnetic cover member 12, the plate member 14 redirects at least a substantial portion of any magnetic force directed away from the female half toward the female half. The plate member 14 redirects at least a substantial portion of the magnetic force that is exerted in a direction opposite from the female half 50 of the coupler.

The magnetic force directed toward the female half 50 of the coupler is of a strength great enough to maintain the magnetic cover member 12 in place during normal operation of the tractor or other equipment utilizing a female half of a coupler, but not so great as to prevent the apparatus 10 from being removed by hand. The force is great enough to hold the apparatus 10 on any metallic surface. As shown in FIG. 5, a plurality of hydraulic lines with couplers attached thereto are often mounted in one place. The magnetic force exerted by the magnetic cover member 12 in directions perpendicular to the female half 50 of the coupler is not so great as to cause interference with adjacent couplers.

A very important feature of the apparatus 10 is its ability to be releasably attached to any metallic surface. Thus, when the male half of the coupler is coupled to the female half thereof, the apparatus 10 can be magnetically attached and stored on other parts of the tractor, equipment, etc. This feature prevents the apparatus from falling off the tractor or equipment and from otherwise being lost. In addition, the attaching first surface 16 of the magnetic cover member 12 is kept clean during storage. The thin layer of rubber 40 prevents the first surface 16 of the cover member 12 from scratching paint from the surface of the tractor, equipment or other place where it is attached.

The finger tab 30 or other pry means merely facilitate removal of the apparatus 10 from the female half 50 of the coupler. They can be attached to any part of the apparatus 10.

Referring now to FIGS. 6 through 10, a second preferred embodiment of the present invention is illustrated and generally designated by the numeral 110. The apparatus includes a magnetic cover member 112 and magnetic force deflecting means in the form of a cup member 114. Just like the first preferred embodiment of the present invention, the apparatus 10 is used to protect the open end of the female half of a metallic hydraulic line coupler when the female half is not coupled to the male half of the coupler. The apparatus 110 is specifically designed to protect the open end of the female half of a modified type of coupler. This modified type of coupler is described below.

The magnetic cover member 112 has a first circular surface 116, an opposite circular surface 118 axially spaced from the first surface and a circular peripheral side wall 120 interconnecting the first surface and the second surface. It is shaped in the form of a disk and is preferably formed of ceramic material. As with the first preferred embodiment, the hole 122 is not important to the operation of the apparatus 110.

The cup member 114 is attached to the magnetic cover member 112 and covers the second surface 118 and side wall 120 thereof. It includes a base 124 having a circular inner surface 126 and an opposite circular outer surface 128, and a circular peripheral side wall 130 extending from the base to form a cup. The inner surface 126 forms the bottom of the cup. The side wall 130 includes a first end 132 attached to the base 124 and a second end 134 forming the annular rim of the cup. A hole 136 is disposed through the inner surface 126 and outer surface 128 of the base 124. The cup member 114 is preferably formed of steel.

As shown in FIG. 7, the magnetic cover member 112 fits within the cup member 114. The inner surface 126 of the base 124 of the cup member 114 is attached to the second surface 118 of the magnetic cover member 112. The side wall 130 of the cup member 114 is sufficiently spaced from the side wall 120 of the cover member 112 to form an annular air gap therebetween. By providing an air gap between the side wall 130 of the cup member 114 and the side wall 120 of the cover member 112, the reach or range of the magnetic force or flux exerted by the cover member is increased. Without the gap, a substantial portion of magnetic force or flux is directed from the side wall 130 of the cup member 114 along the surface of the cover member 112. The gap causes this magnetic force or flux to arc out from the surface of the cover member toward the female half of the coupler. As the width of the gap is increased, the range of the magnetic force or flux exerted by the cover member is increased. As the range is increased, the concentration of force or flux in one place is decreased. The gap is preferably from about 0.05 inches to about 0.10 inches in width. If desired, the gap can be filled with a non-magnetic material, so long as the material does not affect the operation of the cup member 114.

Pry means in the form of a finger tab 140 are attached to the outer surface 128 of the base 124 of the cup member 114. The finger tab 140 includes a curvilinear portion 142 having a first end 144 attached to a rectangular plate 146 and second end 148 attached to a tab portion 150. The rectangular plate 146 is attached to the outer surface 128 of the base 124 of the cup member 114 and the tab portion 150 is positioned above the same. As with the first preferred embodiment, the pry means can be in any form, including a knob attached to the outer surface 128 of the cup member 114.

A disk-shaped gasket 154 can be attached to the first surface 116 of the magnetic cover member 112. The diameter of the gasket 154 is at least as large as the diameter of the first surface 116 of the magnetic cover member 112. The gasket 154 covers the first surface 116 of the magnetic cover member 112 and the second end 134 of the side wall 130 of the cup member 114. It is attached to the first surface 116 of the magnetic cover member 112 and/or the second end 134 of the side wall 130 of the cup member 114.

A thin layer of rubber can be attached to the first surface 116 of the magnetic cover member 112 or to the entire cover member. If a layer of rubber is attached to the first surface 116, use of the gasket 154 will not be necessary. Alternatively, the entire apparatus 110 can be coated with a thin layer of rubber after it is assembled together. The layer of rubber protects the cover member 112 and other parts from chipping and prevents any pieces or chips, if any, from entering the hydraulic systems of the tractor, equipment or the like. The rubber also acts as a seal between the cover member 112 and the female half of the coupler, and prevents the cover member from scratching paint from the surface of the tractor, equipment or other place where it is attached when it is not in use.

Referring now to FIGS. 8-10, the operation of the apparatus 110 will be described. The apparatus 110 is specifically designed to protect the open end of the female half of a hydraulic line coupler of the type wherein the female half is mounted in a metallic coupler housing. A female half 160 of a coupler of this type is schematically illustrated in FIGS. 8 and 9. The male half of the coupler is not shown. The female half 160 includes an elongated, cylindrical fluid passage cavity 162 mounted in a coupler housing 164. As shown in FIG. 8, the housing 164 is used to mount the female halves of two couplers. The housing 164 is part of the female halves 160 of the couplers. The cavity 162 includes an annular first end 166 extending through a surface 168 of the housing 164 and a second end 170 attached to an outlet 172. The outlet 172 is attached to a hydraulic line 174 which carries hydraulic fluid to and/or from the hydraulic system of the tractor, truck, implement or the like. The male half of the coupler is inserted into the cavity 162 through the first end 166 to couple the halves and corresponding hydraulic lines together. An annular locking mechanism 176 is used to maintain the male half in place.

When the male half of the coupler is not coupled to the female half 160 thereof, the first end 166 is open to the atmosphere. The apparatus 110 of the present invention is used to cover and protect this open end. It can be used to cover and protect the open end of the female half of any coupler of the type wherein the female half is mounted in a coupler housing. The particular type of housing and coupler described above and shown in the drawings is only one of many types.

Just the like the first preferred embodiment, the magnetic cover member 112 of the apparatus 110 is releasably attachable to the female half 160 of the coupler by the exertion of magnetic force thereon. The first surface 116 of the magnetic cover member 112 completely covers the open end 166 of the female half 160 when the cover member is magnetically attached thereto. The magnetic force is exerted on the coupler housing 164, the fluid passage cavity 162 and/or the locking mechanism 176.

The first surface 116 of the magnetic cover member 112 is sufficiently flat and smooth to create a dust-tight seal between the open end 166 and the atmosphere when the cover member is attached to the female half 160 of the coupler. The diameter of the annular, open end 166 of the female half 160 of the coupler is less than the diameter of the first surface 116 of the magnetic cover member 112. The diameter of the first surface 116 of the magnetic cover member 112 is sufficiently large for the surface to cover the open end of the female half of any size coupler of the type shown and described. The first surface 116 contacts part of the coupler housing 164 as well as the open end 166 and other parts of the coupler. With some types of couplers, the open end 166 sticks out from the surface 168 of the housing 164 and the first surface 116 does not actually contact the housing.

The magnetic cover member 112 is polarized like an ordinary disk-shaped magnet; i.e., with the north pole on one surface and the south pole on the opposite surface of the disk. With normal polarization, the cover member 112 tends to center on the open end 166 of the female half of the coupler.

Only part of the magnetic force exerted by the magnetic cover member 112 is exerted toward the female half 160 of the coupler. In order to increase the amount of magnetic force exerted on the female half 160 of the coupler without increasing the mass of the magnetic cover member 112, the cup member 114 redirects at least a substantial portion of any magnetic force exerted away from the female half toward the female half. The gap formed between the side wall 130 of the cup member 114 and the side wall 120 of the cover member 112 makes this possible. The cup member 114 redirects at least a substantial portion of the magnetic force exerted in a direction opposite and perpendicular from the female half 160 of the coupler. It creates the effect of concentric poles and increases the magnetic force exerted on the female half 160 as much as possible without increasing the mass of the cover member 112.

The magnetic force exerted is of a strength great enough to maintain the magnetic cover member is place during normal operation of the tractor, truck or equipment, but not so great as to prevent the apparatus 110 from being removed by hand. The force is great enough to hold the apparatus 110 on any metallic surface. Thus, the apparatus 110 can be stored on other parts of the tractor, truck or equipment when it is not in use. Any magnetic force exerted in directions perpendicular to the female half 160 is not so great as to interfere with adjacent couplers. Thus, a plurality of female halves mounted adjacent to each other can be covered at the same time. As shown in FIG. 10, it is not uncommon for several couplers to be mounted in one place.

The gasket 154 helps seal the open end 166 of the female half 160 from dust, dirt and other contaminants.

The finger tab 140 or other pry means facilitate removal of the apparatus 110 from the female half 160 of the coupler. They can be attached to any part of the apparatus 110.

Thus, the apparatus of the present invention provides a means for protecting the open end of the female half of a metallic hydraulic line coupler when the female half is not coupled to the male half of the coupler. The apparatus of this invention is well adapted, therefore, to carry out the objects and attain the ends and advantages mentioned as well as those inherent therein. While numerous changes in the construction and arrangement of parts will suggest themselves to those skilled in the art, such changes are encompassed within the spirit of this invention as defined in the pending claims.

What is claimed is:

1. An apparatus for protecting the open end of the female half of a metallic hydraulic line coupler, comprising:
   a magnetic cover member releasably attachable to said female half of said coupler by the exertion of magnetic force thereon, said cover member having a first surface which completely covers said open end of said female half when said cover member is magnetically attached thereto.

2. The apparatus of claim 1 wherein said magnetic force is of a strength great enough to maintain said cover member in place, but not so great as to prevent said cover member from being removed by hand.

3. The apparatus of claim 1, further comprising magnetic force deflecting means attached to said magnetic cover member for redirecting at least a substantial portion of any of said magnetic force directed away from said female half of said coupler toward said female half of said coupler.

4. The apparatus of claim 3 wherein said magnetic cover member is shaped in the form of a disk having a second surface axially spaced from said first surface and a circular peripheral side wall interconnecting said second surface and said first surface.

5. The apparatus of claim 4 wherein said deflecting means comprises a plate member covering said second surface of said magnetic cover member.

6. The apparatus of claim 4 wherein said deflecting means comprises a cup member covering said second surface and said side wall of said magnetic cover member.

7. The apparatus of claim 1 wherein said magnetic cover member is polarized such that both the north and south poles thereof are located on said first surface.

8. An apparatus for protecting the open end of the female half of a metallic hydraulic line coupler when said female half is not coupled to the male half of said coupler, comprising:
   a magnetic cover member releasably attachable to said female half of said coupler by the exertion of magnetic force thereon, said cover member having a first surface and an opposite second surface axially spaced from said first surface, said first surface completely covering said open end of said female half of said coupler when said cover member is magnetically attached thereto; and
   a plate member attached to said magnetic cover member and covering said second surface thereof, said plate member redirecting at least a substantial portion of any of said magnetic force directed away from said female half of said coupler toward said female half of said coupler.

9. The apparatus of claim 8 wherein said magnetic cover member is polarized such that both the north and south poles thereof are located on said first surface.

10. The apparatus of claim 9 wherein said magnetic force is of a strength great enough to maintain said cover member in place, but not so great as to prevent said cover member from being removed by hand.

11. The apparatus of claim 9 wherein said magnetic cover member is shaped in the form of a disk and has a circular peripheral side wall interconnecting said second surface and said first surface.

12. The apparatus of claim 11 wherein said plate member is shaped in the form of a disk and comprises a circular first surface, an opposite circular second surface axially spaced from said first surface and a circular peripheral side wall interconnecting said first surface and said second surface, said first surface of said plate member being attached to said second surface of said magnetic cover member and having a diameter at least as large as the diameter of said first surface of said magnetic cover member.

13. The apparatus of claim 12 wherein said magnetic cover member is formed of ceramic material.

14. The apparatus of claim 13, further comprising a thin layer of rubber attached to said first surface and said side wall of said magnetic cover member.

15. The apparatus of claim 13 wherein said plate member is formed of steel.

16. The apparatus of claim 13, further comprising pry means attached to said second surface of said plate member for facilitating removal of said magnetic cover member from said female half of said coupler.

17. The apparatus of claim 16 wherein said pry means comprises a finger tab.

18. The apparatus of claim 8 wherein said open end of said female half of said coupler is annular in shape, and said first surface of said cover member has a diameter greater than the diameter of said open end.

19. An apparatus for protecting the open end of the female half of a metallic hydraulic line coupler when said female half is not coupled to the male of said coupler, comprising:
   a magnetic cover member releasably attachable to said female half of said coupler by the exertion of magnetic force thereon, said cover member having a first surface, an opposite second surface axially spaced from said first surface and a peripheral side wall interconnecting said first surface and said second surface, said first surface completely covering said open end of said female half when said cover member is magnetically attached thereto; and
   a cup member attached to said magnetic cover member and covering said second surface and said side wall thereof, said cup member redirecting at least a substantial portion of any of said magnetic force directed away from said female half of said coupler toward said female half of said coupler.

20. The apparatus of claim 20 wherein said magnetic force is of a strength great enough to maintain said cover member in place, but not so great as to prevent said cover member from being removed by hand.

21. The apparatus of claim 19 wherein said magnetic cover member is shaped in the form of a disk.

22. The apparatus of claim 19 wherein said magnetic cover member is formed of ceramic material.

23. The apparatus of claim 19 wherein said cup member is formed of steel.

24. The apparatus of claim 21, further comprising pry means attached to said cup member for facilitating removal of said magnetic cover member from said female half of said coupler.

25. The apparatus of claim 19 wherein said cup member comprises:
 a base; and
 a peripheral side wall extending from said base, said side wall of said cup memer being sufficiently spaced from said side wall of said cover member to form a gap therebetween.

26. The apparatus of claim 19, further comprising a gasket attached to said first surface of said magnetic cover member.

27. The apparatus of claim 19 wherein said open end of said female half of said coupler is annular in shape, and said first surface of said magnetic cover member has a diameter greater than the diameter of said open end.

* * * * *

UNITED STATES PATENT AND TRADEMARK OFFICE
CERTIFICATE OF CORRECTION

PATENT NO. : 4,706,834
DATED : November 17, 1987
INVENTOR(S) : Michael K. Farney and Jackson Kile It is certified that error appears in the above-identified patent and that said Letters Patent are hereby corrected as shown below:

Column 1, line 35, delete the word "femal" and insert the word --female-- therefor;

Column 10, line 41, insert the word --half-- between the word "male" and the word "of";

Column 10, line 59, delete the numeral "20" and insert the numeral --19-- therefor; and Column 11, line 10, delete the word "memer" and insert the word --member-- therefor.

Signed and Sealed this

Twelfth Day of April, 1988

*Attest:*

DONALD J. QUIGG

*Attesting Officer*  *Commissioner of Patents and Trademarks*